United States Patent
Helgeland

(10) Patent No.: US 8,720,900 B2
(45) Date of Patent: May 13, 2014

(54) MAGNETIC FLUID SEAL WITH SHUNT ELEMENT

(75) Inventor: Walter Helgeland, Charlton, MA (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 129 days.

(21) Appl. No.: 12/510,367

(22) Filed: Jul. 28, 2009

(65) Prior Publication Data

US 2010/0025935 A1  Feb. 4, 2010

Related U.S. Application Data

(60) Provisional application No. 61/084,779, filed on Jul. 30, 2008.

(51) Int. Cl.
*F16J 15/43* (2006.01)

(52) U.S. Cl.
USPC ......................................... 277/410

(58) Field of Classification Search
USPC ......................................... 277/410
See application file for complete search history.

(56) References Cited

U.S. PATENT DOCUMENTS

| | | | |
|---|---|---|---|
| 4,501,566 A * | 2/1985 | Carlson et al. | 445/28 |
| 5,007,513 A * | 4/1991 | Carlson | 192/21.5 |
| 5,826,885 A * | 10/1998 | Helgeland | 277/302 |
| 5,975,536 A * | 11/1999 | Helgeland | 277/410 |
| 6,199,867 B1 * | 3/2001 | Mahoney et al. | 277/410 |
| 6,543,782 B1 * | 4/2003 | Rosensweig et al. | 277/410 |
| 7,129,609 B1 | 10/2006 | Mikhalev et al. | |
| 2007/0236828 A1 | 10/2007 | Mikhalev et al. | |

FOREIGN PATENT DOCUMENTS

| | | |
|---|---|---|
| EP | 1898133 A | 3/2008 |
| WO | WO 98/14726 A | 4/1998 |
| WO | WO 98/49473 A | 11/1998 |

* cited by examiner

*Primary Examiner* — Vishal Patel
(74) *Attorney, Agent, or Firm* — Brinks Gilson & Lione

(57) ABSTRACT

A magneto-fluidic seal includes a shaft, a pole piece, and a plurality of sealing fluid rings located between the shaft and the pole piece. The sealing fluid rings may be defined by the shaft and/or the pole piece and contain a ferromagnetic fluid. At least one channel having a bottom is defined by either the shaft or the pole piece. A shunt is located directly adjacent to the bottom of the channel. The thickness of the shunt is based on the energy differential in the plurality of sealing fluid rings as the fluid is displaced from one side of the sealing fluid rings to the other side of the sealing fluid rings.

8 Claims, 6 Drawing Sheets

US 8,720,900 B2

MAGNETIC FLUID SEAL WITH SHUNT ELEMENT

CROSS REFERENCE TO RELATED APPLICATION

This application claims the benefit of U.S. provisional application entitled MAGNETIC FLUID SEAL WITH SHUNT ELEMENT IN THE MAGNETIC CIRCUIT, application No. 61/084,779 filed on Jul. 30, 2008, the entirety of which is hereby incorporated by reference.

BACKGROUND OF THE INVENTION

1. Description of the Related Art

The present invention relates to magnetic fluid seal systems.

2. Description of the Known Technology

Magnetic fluid seals generally include a rotatable shaft and a unitized sub-assembly of ring magnets and pole rings. Dimensions are controlled to produce small annular gaps between pole ring tips and the shaft surface. Strong magnetic fields exist in these gaps. A small amount of ferrofluid is added at each gap and is held by the field as liquid rings in the gaps, with gas-filled spaces confined between adjacent rings. The number of magnets and annular gaps may vary and the pole rings may, in fact, be formed as a single pole piece. Whatever the detailed design may be, all such devices perform their sealing function as described in the next paragraph.

If pressure is the same on both sides of a fluid ring, the fluid assumes an equilibrium position determined by the strength and configuration of the local magnetic field. Any difference in pressure from one side of a fluid ring to the other tends to displace the fluid axially from its equilibrium position. Displacing a ring from its equilibrium position leads to a net axial force that opposes the pressure difference that produced the displacement. If the pressure difference becomes large enough, the liquid ring bursts open, and gas flows from one side of the gap to the other. The pressure at which the ring bursts is called the "pressure capacity" of the ring. The pressure capacity of a multi-stage device (i.e. multiple liquid rings arranged in series on the same shaft) is the sum of the pressure capacities of individual stages. As fluid seals are utilized in environments of significant pressure difference, increasing the pressure capacity of ferrofluid seals is highly desirable.

BRIEF SUMMARY OF THE INVENTION

In overcoming the drawbacks of the prior art, a magneto-fluidic seal includes a shaft, a pole piece, and a plurality of sealing fluid rings located between the shaft and the pole piece. The sealing fluid rings may be defined by the shaft and/or the pole piece and contain a ferromagnetic fluid. At least one channel having a bottom is defined by either the shaft or the pole piece. A shunt is located directly adjacent to the bottom of the channel. The thickness of the shunt is based on the energy differential in the plurality of sealing fluid rings as the fluid is displaced from one side of the sealing fluid rings to the other side of the sealing fluid rings.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
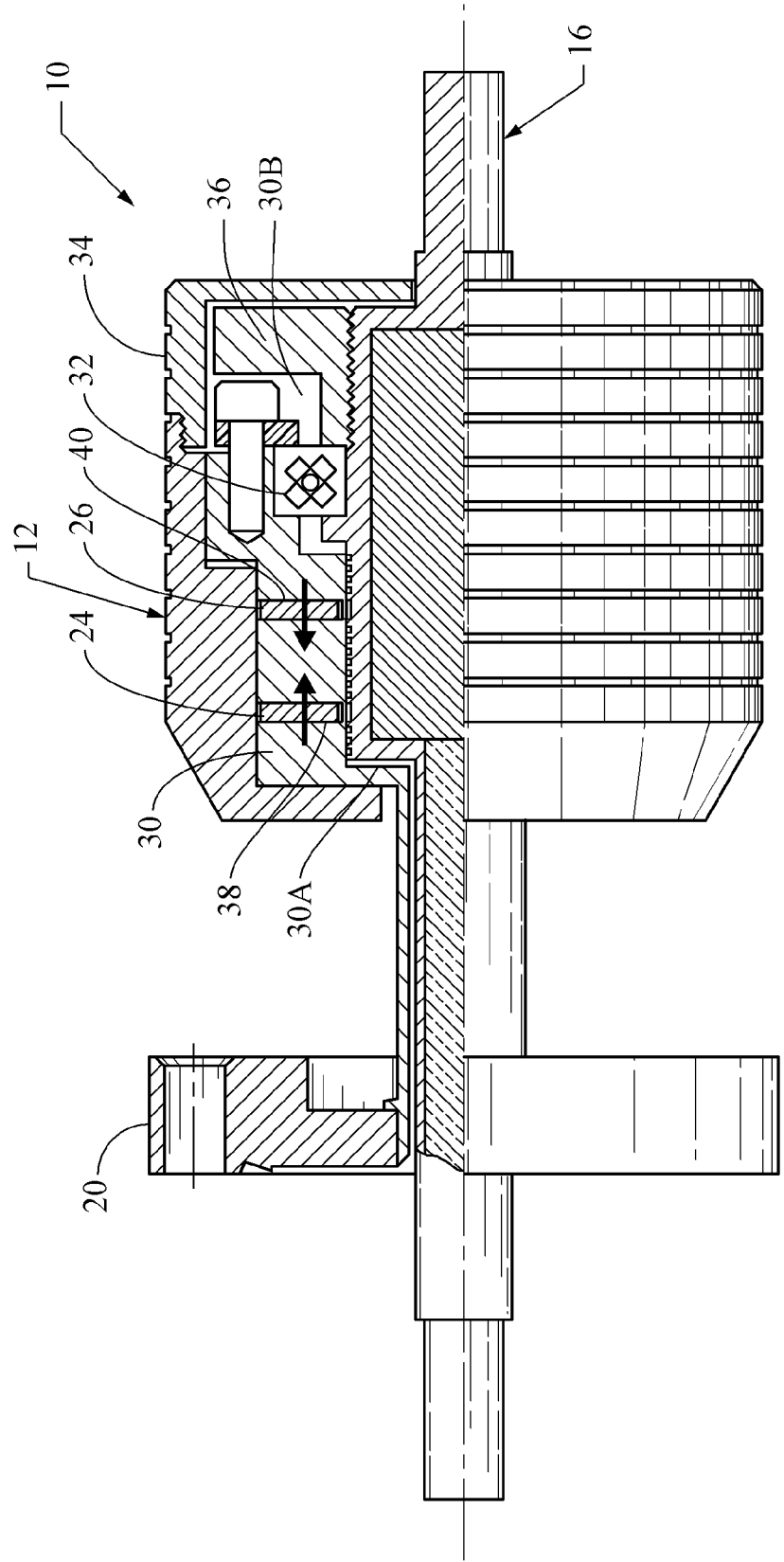
FIG. 1 illustrates a Satwall configuration of a magneto-fluidic seal.

Referring to FIG. 1, a first embodiment of the invention is shown in a "Satwall" configuration. Here, a magneto-fluidic seal 10 according to this embodiment is housed in a generally cylindrical housing comprising an aluminum housing 12 and aluminum end cap 34. A rotatable shaft 16 is inserted through a central opening in the end cap 34. The left end of the shaft 16 extends through an opening in flange 20 which is adapted to mount the magneto-fluidic seal 10 in a vacuum environment at elevated temperatures. The right end thereof as viewed in FIG. 1, is adapted to be disposed in a normal atmospheric environment at ambient temperatures. Note, since the device is radially symmetric, only the top half is shown in detail in FIG. 1. A single cross-roller bearing 32 secured by aluminum bearing nut 36 rotatably holds shaft 16 and provides a large resistance against force moments which would tend to tilt the shaft 16.

Within the housing, alternately disposed in series in the axial direction, are at least a pair of permanent magnets 24 and 26 separated by an annular pole piece 30.

Pole piece 30 is formed from magnetic stainless steel. On its outside diameter, the pole piece contains two channels 38 and 40 which are deep enough to fully contain magnets 24 and 26, efficiently capturing magnetic flux from the magnets. A unitary pole piece with segmented or button-shaped magnets 24 and 26 inserted into the channels 38 and 40 is the preferred construction, but it is also possible to use a built-up pole piece (central tube with outer rings slipped onto it) and full ring magnets. The unitary construction is preferred because manufacturing costs will be lower, since (a) only a single machined piece is required, and (2) a single standardized magnet component (button or segment) can be used in many different magnetic assemblies.

The pole piece 30 contains a first cylindrical cavity 30A ("sealing cavity") of diameter slightly larger than the outside diameter of shaft 16, and a second cavity ("bearing mount cavity") 30B. These cavities are coaxial, thereby establishing the overall alignment of the shaft 16, bearing region 30B and sealing region 30A.

The magnets 24 and 26 are arranged so that the polarity of the magnets on opposite side of the pole piece 30 is symmetrical with respect to the pole piece; i.e., the polarity of the opposite surfaces of the two adjoining magnets is the same as each other.

Figure 2:
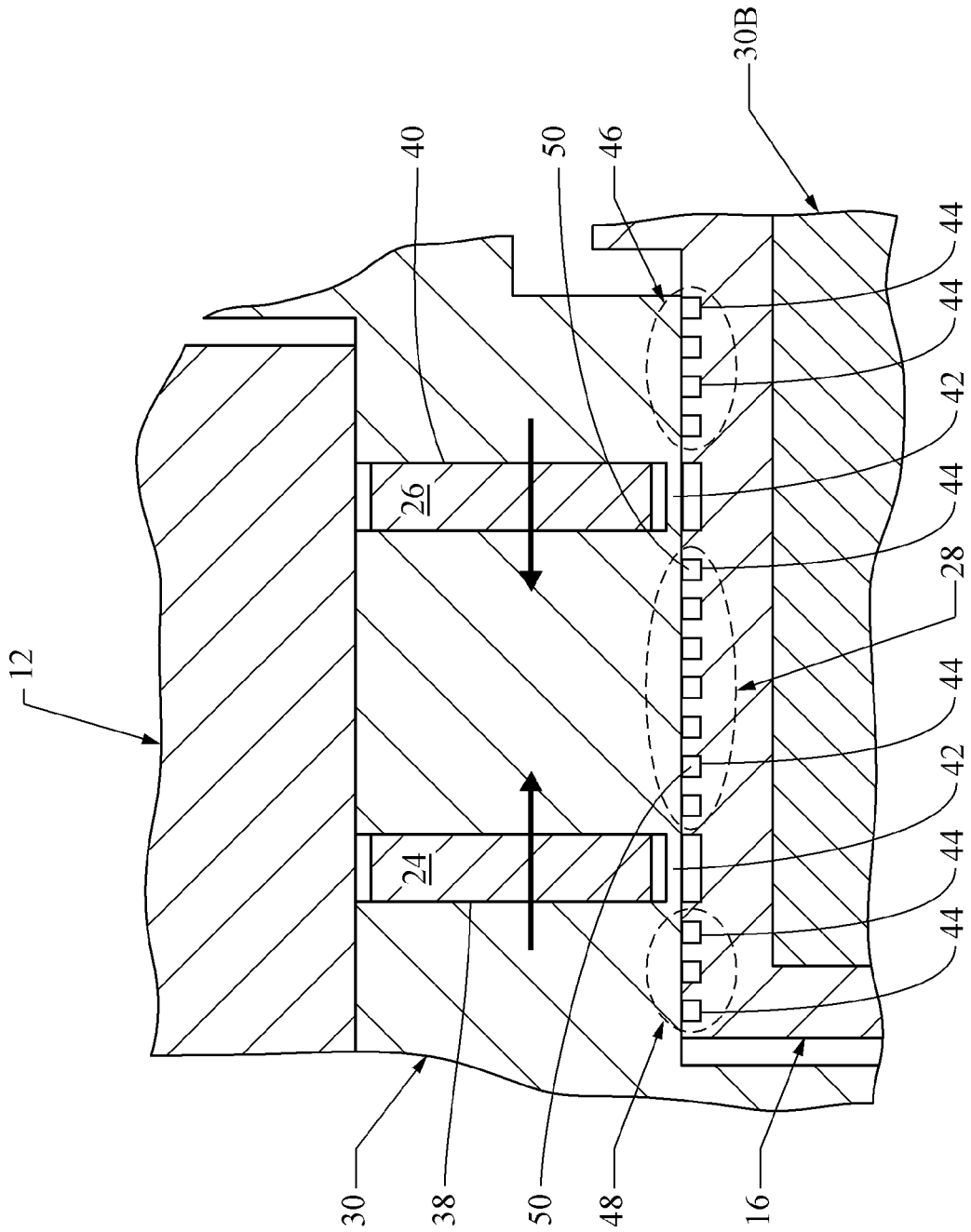
FIG. 2 illustrates a more detailed view of the magneto-fluidic seal of FIG. 1.

In FIG. 2, the shunt wall sections 42 of pole piece are shown. If a unitary pole piece construction is used, these sections are formed as an integral part of the pole piece. The magnet-holding channels or gaps 38 and 40 are machined to a depth that will be described later in the paragraphs that follow.

These shunt walls 42 are strong enough to support the pressure difference across the device, i.e., between atmosphere and vacuum, while thin enough to become magnetically saturated by the two ring magnets 24 and 26. If very high saturation of the walls 42 is achieved, then the remaining magnetic energy will be sufficient to produce sufficient high flux levels to seal gaps 50.

Computer simulation of the magnetic system was used to find a combination of design parameters which would allow a shunt wall to be used, while still providing high magnetic fields in the sealing gaps. A range of design parameters was found over which it was possible to achieve comfortably large magnetic fields in the sealing gaps while still maintaining shunt wall thickness large enough to provide the strength and vacuum integrity required. More specifically, the following parameters and ranges may be used:

a) The magnets 24 and 26 used were rare earth magnets (e.g., SmCo or NdBFe), with an energy product of 18 MGO or greater, formed in the shape of buttons 9.0 mm diameter x2.0 mm thick.

b) The recommended pole piece material is magnetic stainless steel, e.g., 17-4PH, or any 400-series stainless steel.

c) The number of shaft grooves 44 should be a minimum of 4 and preferably 8 to 15. Groove depths of 0.5 mm and widths of 0.5 mm, with 0.5 mm spacing between grooves are preferred. The groove depth should be at least four times the radial gap between shaft and pole piece.

When the device is assembled and end cap 34 is joined to housing 12 by an epoxy or other adhesive, a measured amount of ferromagnetic fluid (sufficient to fill a limited number of sealing gaps 50) is placed on the shaft in the "secondary sealing region" 46, and the shaft 16 is inserted into the pole piece 30. When the fluid-wetted section enters the pole piece, the fluid spreads evenly around the shaft 16 filling the gaps and forming isolated pockets of trapped air in the sealing gaps or grooves 50 of the shaft. A pressure differential is applied across the assembly (vacuum pumping on the flanged end), and some fluid is drawn further into the "primary sealing region" 28. It has been determined that only a few (e.g., four) stages are required to support the full pressure differential (1 atmosphere), provided the magnetic field strength is high enough, in the "primary sealing region." The sealing gaps 44 in the "secondary sealing region" also provide some degree of sealing, although these stages will be weaker than in the "primary sealing region," because the field strength in these gaps is less.

Figure 3:
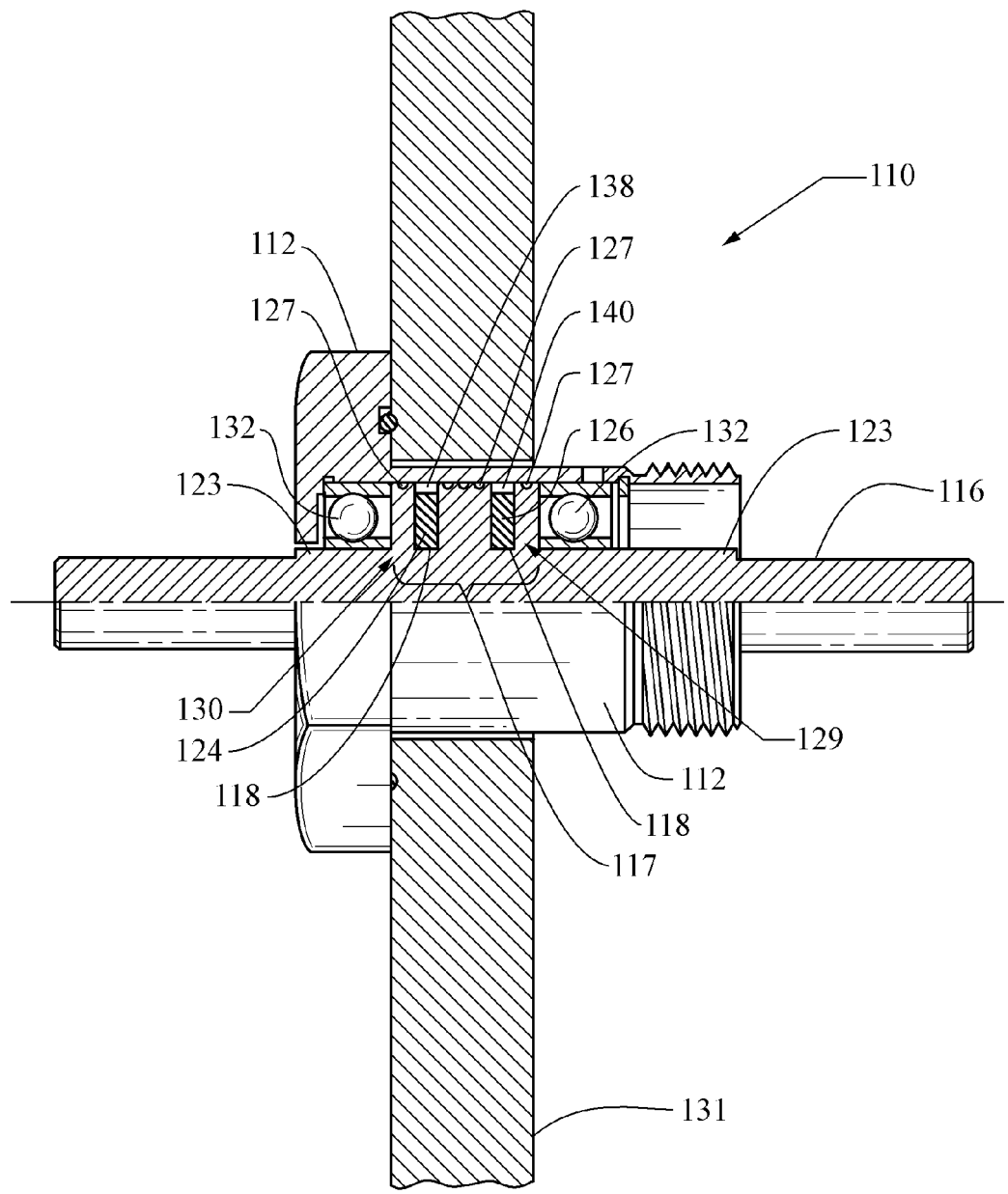
FIG. 3 illustrates a Superseal configuration of a magneto-fluidic seal.

Referring to FIG. 3 of the drawings, a second embodiment of a magneto-fluidic seal 110, shown in longitudinal half-section, will be described in detail in connection therewith. It should be understood that like reference numerals will be utilized to describe like components—with the exception that these reference numerals will be preceded with the numeral "1." It should be further understood that the device is symmetric and that therefore only the upper half section needs to be shown. This type of configuration is generally referred to as a "Satwall" configuration.

A generally cylindrical housing 112 extends through and is affixed to barrier wall 131. The housing 112 encircles a rotary shaft 116 which is inserted through a central portion of the housing in an axial direction.

A central section 117 of the shaft 116 is formed with two channels 138 and 140 for containing magnets 124 and 126, respectively. The central section 117 also includes five shaft grooves defining pole rings 129 and shoulders 123 against which bearings 132 are mounted. Preferably, the bearings 132 are disposed so as to straddle the sealing region which extends axially between the shoulders 123. Essentially, the pole piece 130 is defined by the shaft 116.

Preferably, shaft 116 is formed of ferromagnetic material suitable for use in the intended process (vacuum) environment in which one end of the shaft is exposed to the atmosphere, and the opposite end extends through a barrier 129 to a vacuum environment.

The function of the grooves is to define several distinct pole gaps 127 (in this case eight) spaced axially apart from each other. The magnets 124 and 126 are inserted into the channels 138 and 140 of the shaft 116. The magnets 124 and 126 may be half sectors of the ring magnets or may be small cylinders or any of several sector shapes. All magnets in a single channel have their magnetic polar orientation in the same direction. Preferably magnets in the second channel are oriented with magnetic polarity opposite to the magnets in the first channel. This opposed-polarity condition results in a finished assembly with enhanced magnetic flux in the sealing gaps and minimum external magnetic field as will be explained below.

Magnets 124 and 126 must be positively retained in the channels in order to prevent them from sliding out as a result of mutual magnetic repulsion or centrifugal force. The means of retention is not shown here. Typical retention methods would be (1) epoxy to secure the magnets in the grooves, (2) a thin wire or band placed as a hoop around the magnets or (3) rolled edges on the magnet channels. In any case, the retaining means must not extend radially beyond the slot boundary, or it will contact the housing inner surface during rotation.

To further illustrate other embodiments of the invention, FIGS. 4A-4D are provided. FIGS. 4A-4D illustrate simplified embodiments of magneto-fluidic seals so as to bring attention to differing variations. It should be understood that like reference numerals will be utilized to describe like components, with the exception that these reference numerals will be preceded with the numeral "2" and followed by the letters "A-D." The letterers "A-D" relate to components shown in FIGS. 4A-4D, respectively. Like the other Figures, it should be further understood that the device is symmetric and that therefore only the upper half section needs to be shown.

Magneto-fluidic seals 210A-210D each include shafts 216A-216D and pole pieces 230A-230D. However, in FIGS. 4A and 4B, channels 238A, 238B, 240A and 240B are formed in the shafts 216A and 216B. Conversely, in FIGS. 4C and 4D, channels 238C, 238D, 240C and 240D are formed in the pole pieces 230C and 230D.

Figure 4A:
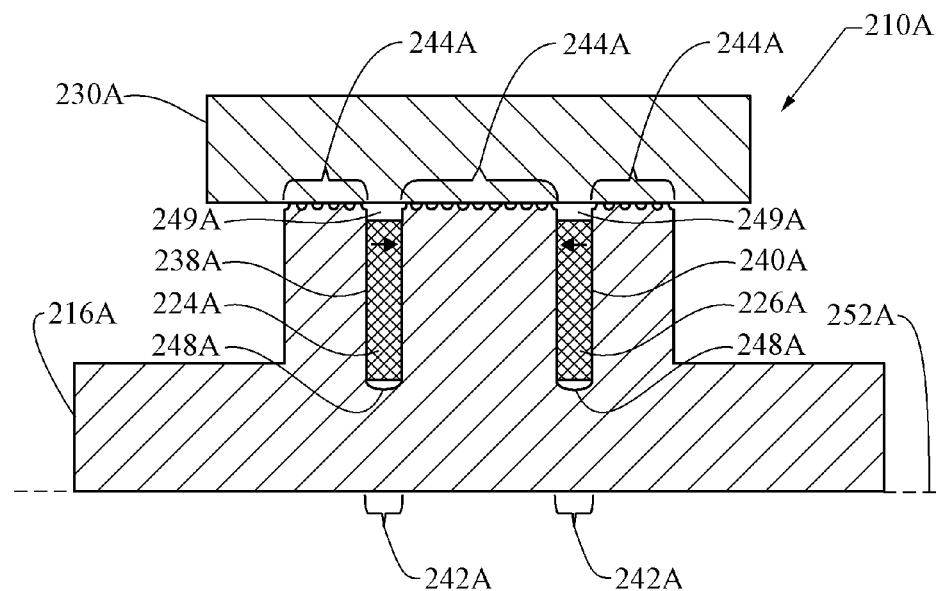
FIGS. 4A-4D illustrate different embodiments of magneto-fluidic seals with shunt walls.
Figure 4B:
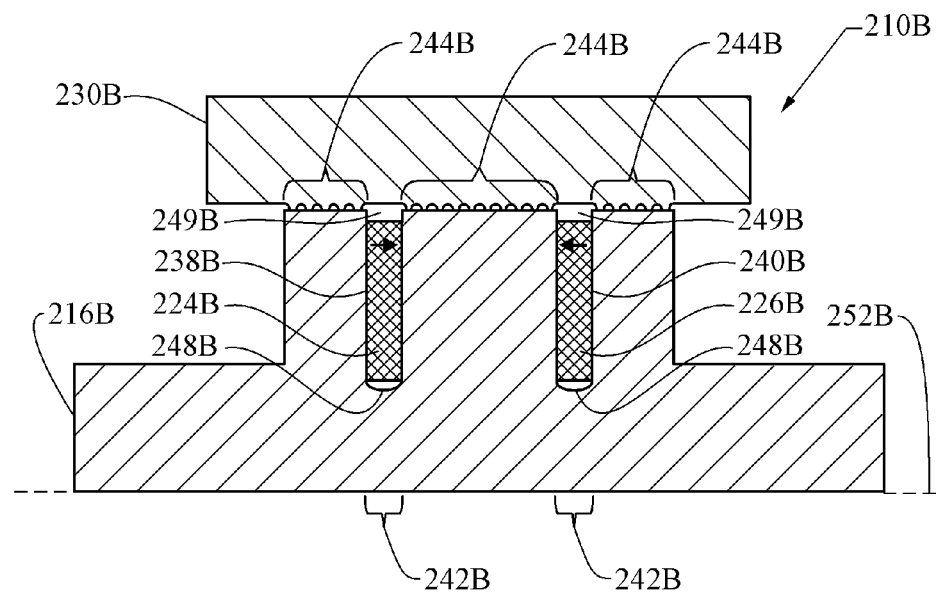
Figure 4C:
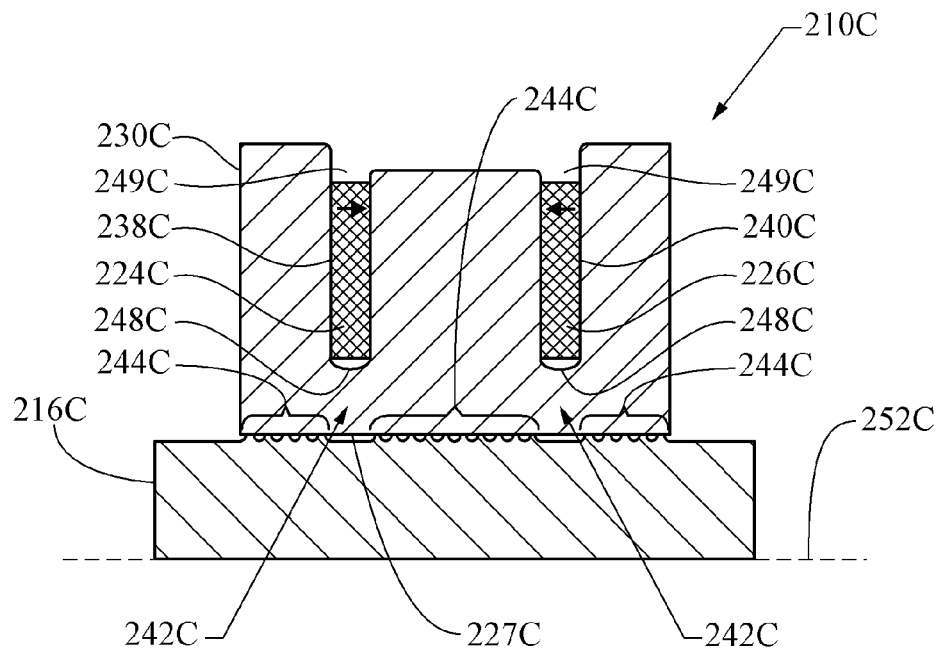

Also, FIGS. 4A and 4C include grooves 244A and 244C formed and defined by the shafts 216A and 216C, respectively. Conversely, FIGS. 4B and 4D include grooves 244B and 244D formed and defined by the pole pieces 230B and 230D, respectively. Therefore, from the description of FIGS. 4A-4D, it should be clear that the grooves and/or the channels can be formed on either the pole pieces or the shafts.

Still referring to FIGS. 4A-4D, the shunt walls 242A-242D are formed on either the shafts 216A and 216B or on the pole pieces 230C and 230D. More specifically, the channels 238A-238D and 240A-240D each have a bottom 248A-248D and a top 249A-249D, respectively. As explained previously, channels 238A-238D and 240A-240D are defined by either the shafts 216A-216B or the pole pieces 230C-230D.

The shunt walls 242A-242D each have a thickness. In the case where the shunt walls 242A-242B are defined by the shafts 216A and 216B, the thickness of the shunt walls 242A-242B are each defined by the distance between the bottoms 248A-248B of the channels 224A, 226A, 224B and 226B and a center line (axis) of the shafts 216A-216B, represented by line 252A and 252B. In the case where the shunt walls 242C-242D are defined by the pole pieces 230C and 230D, the thickness of the shunt walls 242C-242D are each defined by the distance between the bottoms 248C-248D of the channels 224C, 226C, 224D and 226D and the inner diameters 227C and 227D of the pole pieces 230C and 230D.

The pressure capacity of ferrofluid seals can be improved by adjusting the thickness of the shunt walls 242A-242D. Some benefits and advantages of this design approach are: (1)

the pressure capacity can be maximized for both Satwall and Superseal devices by selecting the best dimensions for magnets and shunt elements; (2) the force required to overcome viscous drag in the ferrofluid rings is reduced; (3) the wall thicknesses and manufacturing tolerances for Satwall pole pieces are greatly relaxed as compared to the traditional design rule, which states that the shunting wall should be as thin as possible; (4) in Satwall devices that impose mechanical loads (torsion or bending) on the shunting wall, the strength is very greatly increased over thin-walled devices; (5) in Superseal devices, smaller magnets can be used, thereby reducing the diameter of the sealing fluid rings.

This makes the devices more compact and reduces friction and self-heating when the shafts are turned; and (6) in coaxial devices (two or more concentric shafts on a common axis) the benefits listed in items 3 and 4 are both in effect, leading to very compact devices with very high shaft strength.

The major difficulties overcome in the course of developing this innovation have to do with the complexity of calculating magnetic fields and forces in anything other than very simple structures. Simple design methods are not adequate to deal with the complexity of real systems. Finite element analysis ("FEA") allows the magnetic fields to be determined throughout the ferrofluid sealing device. The FEA modeling and analysis procedures used to discover and demon-strate this innovation are a combination of (1) well known modeling ideas, (2) commercially available software, and (3) proprietary implementation of the commercially available tools. Post-processing of data from the FEA solutions is critically important as well, and has been done by a proprietary method.

Figure 4D:
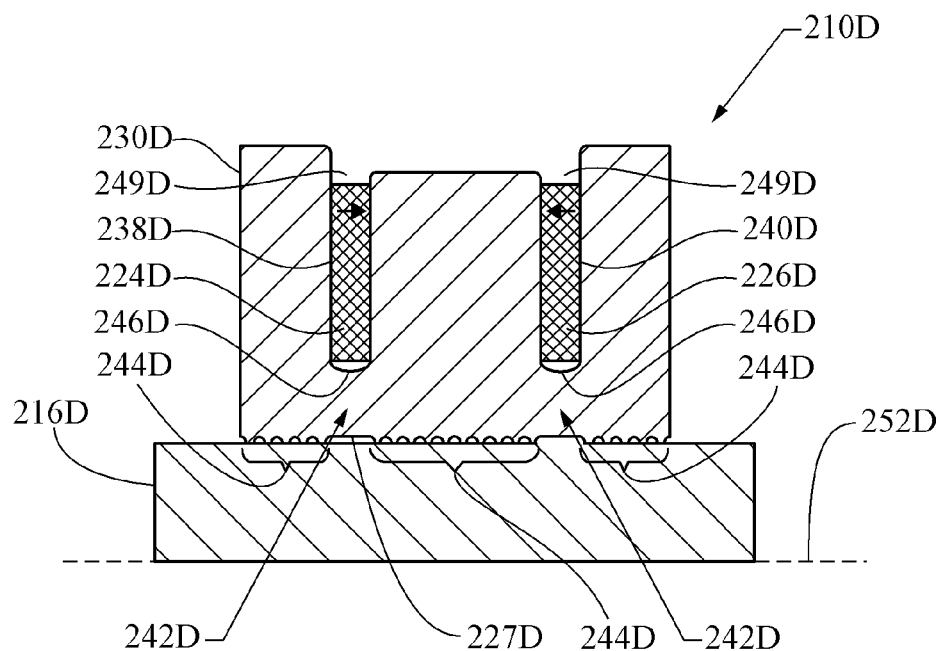
Figure 5:
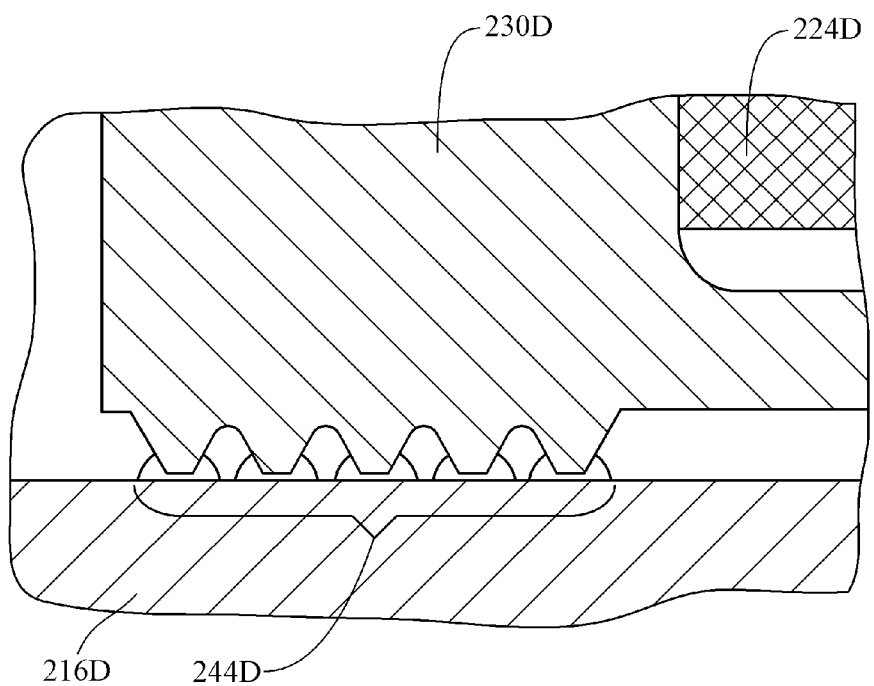
FIGS. 5 and 6 illustrate a more detailed view of the magneto-fluidic seal of FIG. 4D.

Referring to FIG. 5, a more detailed view of the embodiment shown in FIG. 4D is shown. FIG. 5 illustrates the approximate location of the fluid rings when there is no pressure difference across any sealing stage. Although the exact shape of the free surface at each side of each ring depends on the shape of the magnetic field in this region, the fluid will be distributed approximately equally on either side of the pole tip.

Figure 6:
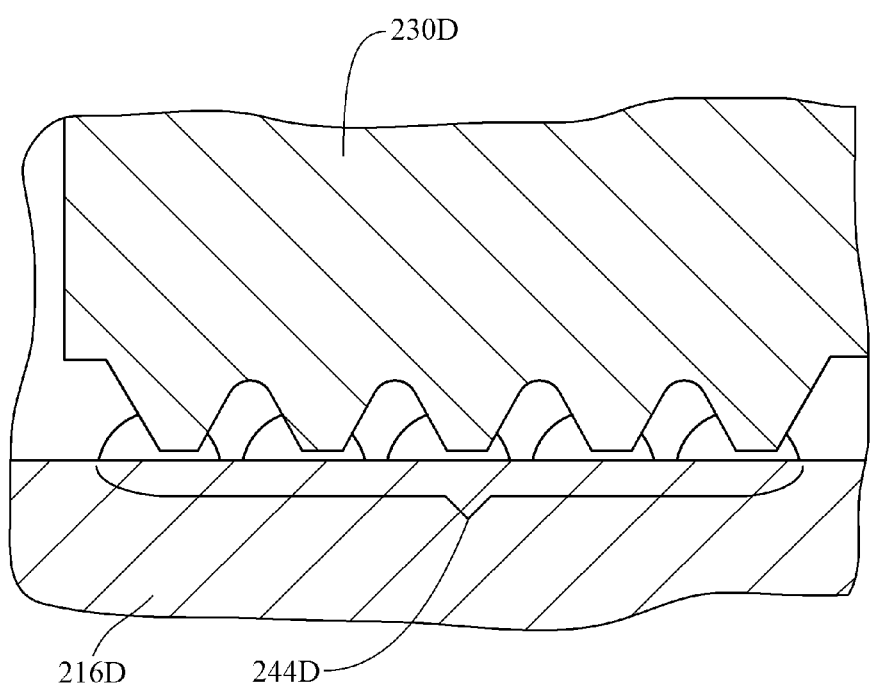

When there is a pressure difference across the sealing stage, the distribution becomes approximately as shown in FIG. 6. In this illustration, the high pressure side is toward the right. Some fluid is displaced from the high pressure side of each fluid ring toward the low pressure side.

The magnetic fields in the fluid regions are no longer symmetrical and balanced on the two sides of each fluid ring. Locations nearest to a gap will have larger field magnitudes and gradients than locations farther away from that gap. This will result in a net force that tends to pull the left side of the fluid ring back toward the gap. This force is in a direction that opposes the pressure difference that displaced fluid in the first place. This restoring force is what supports some pressure difference across the sealing stage.

From elementary physics it is known that whenever any object is moved against an opposing force, physical work is done (Work=Force×Distance). So some work must be done to effect the fluid displacement illustrated here. According to the principle of Work-Energy Equivalence, this work results in an altered energy state for the fluid ring. If the magnetic field throughout the fluid region before and after the displacement is known, one can apply well known procedures to calculate the energies before and after displacement. Once both the energy change ($\Delta E$) and the displacement are known, one can calculate the force that must have been required to produce that energy change. Taking into account the shape of the fluid, one can compute the pressure that corresponds to this force. For the condition of full displacement, this force will be the "pressure capacity".

Note that the change in energy, $\Delta E$, is important, and not the energy itself $\Delta E$ depends on both: (1) the strength of the magnetic field and (2) the field gradient (how rapidly it changes). A ferromagnetic object experiences zero force when it is moved about in a strong field that is absolutely uniform (zero gradient). Even though the magnetic energy in the object is large, there is no change in energy due to the change in location. Hence, there is no force. Some change in field strength with change in location (i.e. a field gradient) must exist in order to have a change in energy.

This implies that the way to maximize pressure capacity is to establish a magnetic field configuration that maximizes $\Delta E$ in the fluid rings over their range of displacement. While strong magnetic fields are desirable, it is advisable to also establish strong gradients as well. It is possible to use very strong magnetic materials and, by means of a magnetic shunt region that diverts some energy away from the fluid region, alter the shape and strength of the field and gradient to maximize $\Delta E$ in the fluid region. Field strength is reduced, but gradient is increased as shunt dimensions increase, but only up to a point. If too much energy is diverted through the shunt, $\Delta E$ will decline (because the fields in the fluid will be too small), and the pressure capacity will fall. So there is some optimum set of dimensions for the shunting region. At this optimum, $\Delta E$ is maximized, and so is the pressure capacity.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A magneto-fluidic seal comprising:
   a shaft;
   a pole piece, wherein a radial gap is located between the shaft and the pole piece;
   at least one channel defined by either the shaft or the pole piece, the annular channel having a bottom;
   a plurality of sealing fluid rings located between the shaft and the pole piece, the sealing fluid rings containing a ferromagnetic fluid;
   a shunt wall being located directly adjacent to the bottom of the channel, the shunt wall having a thickness, the thickness of the shunt is either defined by (a) the distance between the bottom of the channel and a center line of the shaft or (b) the distance between the bottom of the channel and an inner diameter of the pole piece;
   at least one magnet being located within the at least one channel;
   wherein the thickness of the shunt wall is based on the energy differential in the plurality of sealing fluid rings as the fluid is displaced from one side of the sealing fluid rings to the other side of the sealing fluid rings;
   wherein comfortably large magnetic fields in sealing gaps are achieved while still maintaining a shunt wall thickness large enough to provide strength and vacuum integrity;
   a plurality of grooves located on either shaft or the pole piece; and
   wherein a groove depth of the plurality of grooves is at least four times the radial gap between the shaft and the pole piece.

2. The magneto-fluidic seal of claim 1, wherein the sealing fluid rings are defined by the shaft.

3. The magneto-fluidic seal of claim 1, wherein the sealing fluid rings are defined by the pole piece.

4. The magneto-fluidic seal of claim 1, wherein the at least one channel is defined by the shaft.

5. The magneto-fluidic seal of claim 4, wherein the thickness of the shunt wall is defined as the distance between the bottom of the channel and a center line of the shaft.

6. The magneto-fluidic seal of claim 1, wherein the at least one channel is defined by the pole piece.

7. The magneto-fluidic seal of claim 6, wherein the thickness of the shunt wall is defined as the distance between the bottom of the channel and the inner diameter of the pole piece.

8. The magneto-fluidic seal of claim 1, wherein the at least one magnet comprises at least two magnets of opposite polarity.

* * * * *